(12) United States Patent
Koehler

(10) Patent No.: US 11,225,187 B1
(45) Date of Patent: Jan. 18, 2022

(54) ROOF TOP RIG

(71) Applicant: Kristin Koehler, Snowmass Village, CO (US)

(72) Inventor: Kristin Koehler, Snowmass Village, CO (US)

( * ) Notice: Subject to any disclaimer, the term of this patent is extended or adjusted under 35 U.S.C. 154(b) by 0 days.

(21) Appl. No.: 17/225,205

(22) Filed: Apr. 8, 2021

(51) Int. Cl.
*B60P 3/34* (2006.01)
*B60P 3/36* (2006.01)
*E04H 15/08* (2006.01)
*B60R 9/04* (2006.01)
*B60R 9/02* (2006.01)
*E04H 15/14* (2006.01)
*B60R 3/00* (2006.01)

(52) U.S. Cl.
CPC .............. *B60P 3/34* (2013.01); *B60P 3/36* (2013.01); *B60R 3/005* (2013.01); *B60R 9/02* (2013.01); *E04H 15/08* (2013.01); *E04H 15/14* (2013.01)

(58) Field of Classification Search
CPC ... B60R 9/04; B60R 9/042; B60R 2011/0028; B60R 2011/0084; B60P 3/32; B60P 3/34; B60P 3/36; E04H 15/06; E04H 15/08
See application file for complete search history.

(56) References Cited

U.S. PATENT DOCUMENTS

| | | | | |
|---|---|---|---|---|
| 1,734,803 A | * | 11/1929 | Gable | B60P 3/34 296/169 |
| 3,626,892 A | * | 12/1971 | Humbert | B63B 34/63 441/69 |
| 4,222,400 A | | 9/1980 | Reimer | |
| 4,294,486 A | * | 10/1981 | Espejo | E04H 15/32 135/88.15 |
| 4,454,613 A | * | 6/1984 | Palmer | B60R 15/00 296/171 |
| 4,830,036 A | | 5/1989 | Sanders | |
| 5,029,935 A | * | 7/1991 | Dufrancatel | B60P 3/36 296/156 |
| 5,154,469 A | * | 10/1992 | Morrow | B60P 3/34 296/171 |
| 6,035,875 A | | 3/2000 | Chen | |
| 6,749,252 B2 | | 6/2004 | Cervenka | |
| 7,942,465 B1 | * | 5/2011 | Jefferson | B60P 3/36 296/168 |
| 9,222,278 B2 | | 12/2015 | Park | |
| 9,499,999 B2 | | 11/2016 | Zhou | |
| 9,567,767 B2 | | 2/2017 | Kendrick | |
| 10,208,502 B2 | | 2/2019 | Currid | |
| 10,596,951 B1 | * | 3/2020 | Williams | E04H 15/06 |
| 10,808,416 B2 | | 10/2020 | Park | |
| 2003/0094827 A1 | * | 5/2003 | Faludy | B60P 3/36 296/26.06 |
| 2009/0159108 A1 | * | 6/2009 | Dannewitz | B60P 3/064 135/88.05 |
| 2013/0229029 A1 | * | 9/2013 | Pierce | B60P 3/39 296/176 |

(Continued)

*Primary Examiner* — Gregory A Blankenship
(74) *Attorney, Agent, or Firm* — Cramer Patent & Design, PLLC; Aaron R. Cramer

(57) ABSTRACT

A Roof Top Rig is a kit which permits a user to erect a tent upon the top of a utility trailer. The device also provides for at least one fold down bed, at least one fold down table, at least one flip down seat and a portable solar panel. A plurality of electrical generation devices, household convenience devices, and plurality of electrical outlet and wireless communication systems may be included.

16 Claims, 9 Drawing Sheets

(56) References Cited

U.S. PATENT DOCUMENTS

| | | | |
|---|---|---|---|
| 2015/0360568 A1* | 12/2015 | Champagne | B60L 1/003 |
| | | | 296/156 |
| 2016/0059906 A1* | 3/2016 | Leitner | B60R 11/06 |
| | | | 296/3 |
| 2017/0349080 A1* | 12/2017 | Sautter | B60P 3/34 |
| 2018/0027689 A1* | 1/2018 | Muldowney | B60R 1/00 |
| | | | 361/807 |
| 2018/0112432 A1* | 4/2018 | Xu | E04H 15/48 |
| 2019/0009729 A1* | 1/2019 | Mercurio | B60R 9/045 |
| 2019/0031110 A1* | 1/2019 | Cha | B60R 11/04 |
| 2019/0270364 A1* | 9/2019 | Roth | B60P 3/34 |
| 2020/0215956 A1* | 7/2020 | Miller | B60P 3/34 |
| 2020/0317111 A1* | 10/2020 | Mundt | B60P 3/34 |
| 2020/0391650 A1* | 12/2020 | Leishman | B60P 3/39 |
| 2021/0129731 A1* | 5/2021 | Bourdon | B60P 3/34 |
| 2021/0155143 A1* | 5/2021 | Hunter | B60N 2/34 |

* cited by examiner

ROOF TOP RIG

RELATED APPLICATIONS

Non-applicable.

FIELD OF THE INVENTION

The present invention relates generally to a roof top tent and more specifically to a roof top rig for outdoor camping and recreation.

BACKGROUND OF THE INVENTION

Millions of Americans enjoy camping and traveling as their preferred leisure time activity. Among these avid campers, a great deal choose to do so in recreational vehicles that range in size from small pop-up campers that are designed to be towed behind a car or truck to large motorized RV's with integral engines. Another recent option has been roof top tents which are designed to fit atop Jeeps, trucks, and SUV's. They provide ample sleeping space and keep the occupants off of the ground. However, such an option does not provide storage space for camping supplies other than in the vehicle.

Additionally, such supplies as well as the tent must be moved to the vehicle every time one wants to go camping. Finally, while at the campsite, the tent must be lowered every time the vehicle is needed for use. It also requires packing up all camping supplies as well. Accordingly, there exists a need for a means by which the functionality and comfort of a roof top tent can be enjoyed without the current disadvantages as described above. The development of the Roof Top Rig fulfills this need.

SUMMARY OF THE INVENTION

To achieve the above and other objectives, the present invention provides for a roof top tent camper has a vehicle roof top tent which is adapted to be disposed on a utility trailer, an enclosure adapted to be disposed on top of a utility trailer which has an interior, a protective cover which is placed over the vehicle roof top tent, a rack receiving the vehicle roof top tent mounted on the rack, a storage shelf having a charge controller, an inverter, and a Wi-Fi hotspot located under the storage shelf, a ramp which is adapted to be mounted on a rear of a frame of the utility trailer, a plurality of two folding shelves/table disposed on a first side face of the enclosure, a retractable awning mounted to a top platform which is unrolled when at a campsite, a plurality of sliding support tracks disposed on a top plate and hold a plurality of tie-down rings, a plurality of retraction reel housings disposed on the sidewall near the sliding support tracks, the retraction reel housings hold the retractable cable which hold the folding shelves/table, a plurality of incoming power provided by either a solar panel or a wind turbine, both of which are electrically routed into the charge controller, and a plurality of resultant power from the charge controller routed to an inverter which produces 120 volts alternating current which is routed to a pair of AC receptacles. The ramp is disposed opposite a trailer tongue and a hitch. The two folding shelves/table are attached by a continuous hinge and a retractable cable. The top platform includes the top plate and a side stiffener which are supported by a sidewall of the enclosure. The charge controller also charges a battery and input or output power from the battery as needed for a plurality electrical loads, and the resultant power from the charge controller is also routed to a DC distribution panel.

The vehicle roof top tent may be used atop a vehicle selected from the group consisting of a truck, an SUV, or a Jeep. The interior of the disclosure may be accessed via a pair of rear doors that are mounted via a continuous hinge and retained via a locking latch. The rear doors may include a durable mesh material for ventilation and a plurality of solid panels to prevent dust, dirt and one or more small items from entering or exiting the interior of the enclosure. The interior of the enclosure includes a floor and a storage cabinet that is attached to the enclosure via use of one or more adjustable height rails to allow the storage cabinets to be positioned anywhere along a cabinet travel path. The rack may allow for the vehicle roof top tent to be utilized with the roof top tent camper and allows for easy removal for long term storage, off-season storage, and clearance. The ramp may be rotated upward and secured to protect the enclosure. The continuous hinge and the retractable cable may fold flat to not interfere with transportation while the roof top tent camper is in motion and to allow personnel access to stand next to the enclosure to reach the roof top tent. The two folding shelves/table may include a means for retaining to prevent one or more items stored on the folding shelves/table from rolling off. The tie-down rings may be movable and slide and secure in any area desired on the sliding support tracks and is used along with a rope or one or more bungee cords to hold down the rear doors.

The roof top tent camper may also have a tent attached collapsible ladder used to access the roof top tent from a grade and a dish shelf disposed on the lowermost folding shelves/table to hold a plurality of dirty or just washed dishes, an adjustable swing arm light which may be mounted to the top platform for providing general illumination around the campsite during nighttime hours and a pair of AC receptacles disposed on the folding shelves/table for operating one or more appliances, one or more lights, one or more entertaining devices, or one or more means for communicating, folding tool rack which may hold one or more axes, one or more hatchets, one or more shovels, or one or more brooms and a foldable fuel tank holder with a continuous hinge and one or more support cables to hold a fuel tank, a foldable battery rack which may have a continuous hinge and support cables holding a battery selected from the group consisting of a rechargeable deep cycle battery, a Tesla battery, or a lithium-ion battery, a foldable trash bag holder with a continuous hinge and support cables which may hold a trash bag on the enclosure and an open storage area provided in the enclosure which holds one or more camping supplies while the roof top tent camper is transported, and a pair of off-road tires which may be adapted to be utilized on the utility trailer to increase its off-road capabilities and a dishwashing station disposed on a side of the folding shelves/table.

The retractable cable automatically retracts into the retraction reel housings for stowage. The wind turbine may be disposed on the top platform which is deployed while camping or while in motion. The adjustable arm may include the solar panel disposed on a distal end and is rotated 360 degrees. The DC distribution panel supplies power to the multiple swing arm lights as well as the Wi-Fi hotspot.

BRIEF DESCRIPTION OF THE DRAWINGS

The advantages and features of the present invention will become better understood with reference to the following

Figure 1:
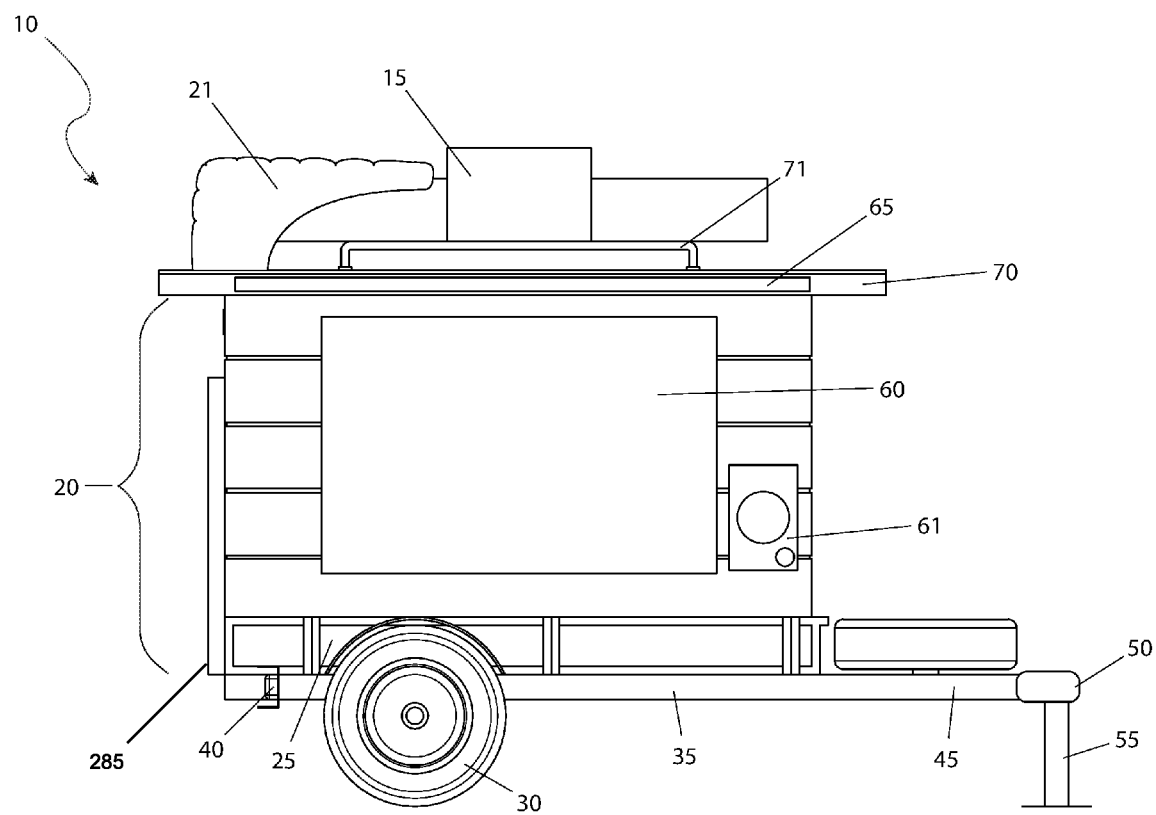
FIG. 1 is a right-side front view of the roof top tent camper, with a roof top tent in a stowed state, according to the preferred embodiment of the present invention.

DESCRIPTIVE KEY 10 roof top tent camper
15 roof top tent
20 enclosure
21 protective cover
25 utility trailer
30 off-road tire
35 frame
40 lights
45 trailer tongue
50 hitch
55 support
60 folding shelves/table
61 dish washing station
65 retractable awning
70 top platform
71 tent mounting rack
75 tent attached collapsible ladder
76 separate detachable collapsible ladder
80 grade
85 continuous hinge
90 retractable cable
95 retaining means
100 AC receptacle
102 dish shelf
105 swing arm light
110 folding tool rack
115 fuel tank holder
120 fuel tank
125 battery rack
130 battery
135 side cover
140 trash bag holder
145 trash bag
150 water container holder
155 water container
160 adjustable arm
165 solar panel
170 wind turbine
171 level
175 wire basket
180 solar water heater
185 rear door
190 locking latch
195 mesh material
200 solid panel
205 retaining clip
210 storage cabinet
215 adjustable height rail
220 cabinet travel path "c"
225 folding bed shelf
230 storage shelf
235 charge controller
240 inverter
242 WiFi hotspot
243 DC distribution panel
245 hooks
250 open storage area
255 top plate
260 side stiffener
265 sidewall
270 sliding support tracks
275 tie-down ring
280 retraction reel housing
285 ramp
290 floor

DESCRIPTION OF THE PREFERRED EMBODIMENTS

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a right-side view of the roof top tent camper 10, with a roof top tent 15 in a stowed state, according to the preferred embodiment of the present invention is disclosed. The roof top tent camper 10 (herein also described as the "camper") 10, provides for a kit which allows a utility trailer 25 to be used as a base for a vehicle roof top tent 15 while enhancing the camping experience. The camper 10 utilizes a roof top tent 15 that is normally used atop a vehicle such as a truck, SUV, or Jeep®. In this figure, the roof top tent 15 is in a stowed but secured position atop an enclosure 20. The enclosure 20 is placed upon a utility trailer 25. In addition to the enclosure 20, a protective cover 21 may be placed over the roof top tent 15. The protective cover 21 is shown partially retracted for purposes of illustration. The roof top tent 15 and the utility trailer 25 are not inclusive to the invention and are general and non-specific to the teachings of the present invention and are not intended to be a limiting factor of the present invention. The utility trailer 25 can be procured by the final user as either a kit (requiring assembly) or as a preassembled unit.

The camper 10 includes kit components that are added to the roof top tent 15 and the utility trailer 25 to produce a complete unit. The roof top tent is mounted on a rack 71. The use of the rack 71 allows for conventional vehicle roof top tents to be utilized with the camper 10 and allows for easy removal for long term storage, off-season storage, clearance issues and the like. A pair of off-road tires 30 (of which only one (1) is shown in FIG. 1, due to illustrative limitations) may be provided in the kit and utilized on the utility trailer 25 to increase its off-road capabilities to allow it to be used at primitive or remote campsites. The utility trailer 25, envisioned to be utilized in different configurations and physical sizes, includes normally expected components such as a frame 35, lights 40, a trailer tongue 45, a hitch 50, a support 55 and the like. A ramp 285 is mounted to the rear of the frame 35, opposite the trailer tongue 45 and hitch 50. The right-side face of the enclosure 20 is provided with at least two (2) folding shelves/table 60, one (1) of which functions as a shelf and one (1) of which functions as a table, herein shown in a retracted state. Further detail on the folding shelves/table 60 will be provided herein below. A dishwashing station 61 may be provided to the side of the folding shelves/table 60. A retractable awning 65 is mounted to a top platform 70 which may be unrolled when at a campsite. It is envisioned that the camper 10, including the roof top tent 15 and the utility trailer 25 provided by the user, would be capable of being towed by almost any standard motor vehicle due to its low weight, short length and low height as shown in FIG. 1.

Figure 2:
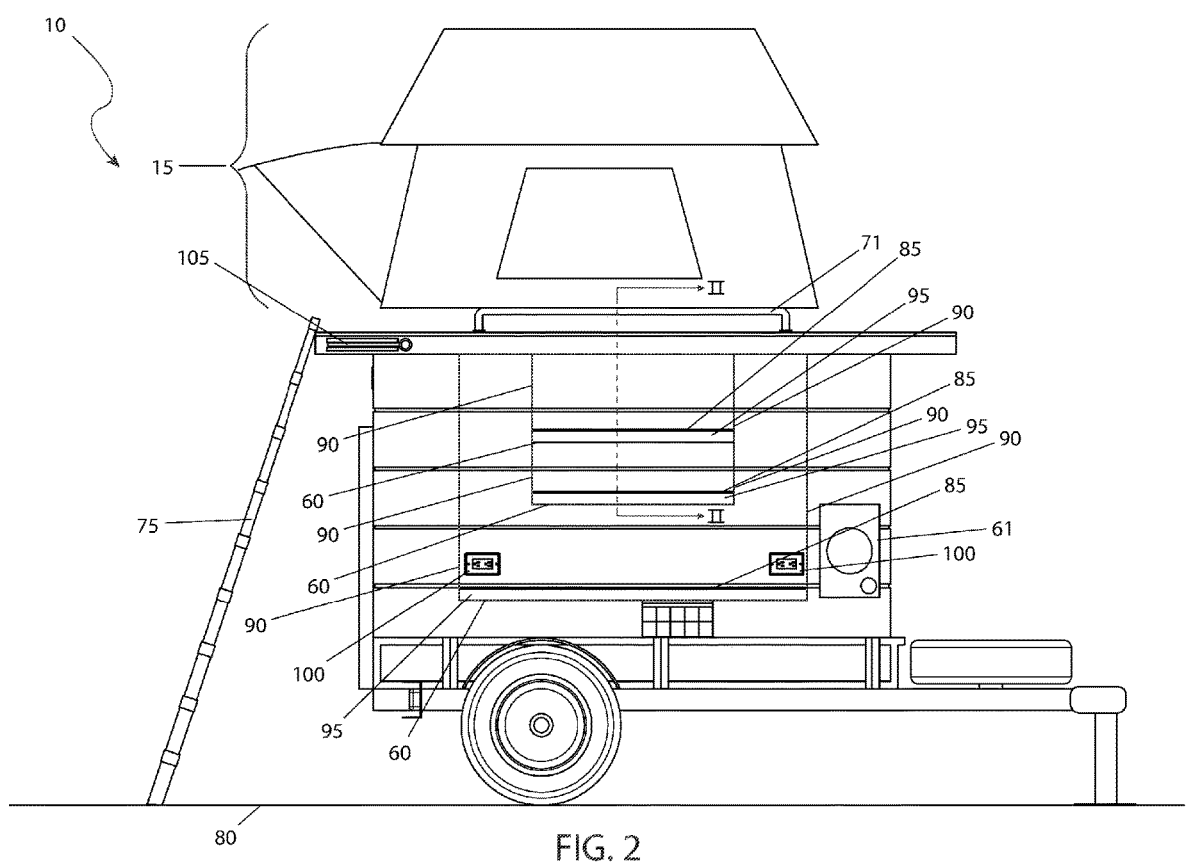
FIG. 2 is a right-side front view of the roof top tent camper, with the roof top tent in a deployed state, according to the preferred embodiment of the present invention.

Referring next to FIG. 2, a right-side front view of the camper 10, with the roof top tent 15 in a deployed state, according to the preferred embodiment of the present invention is depicted. This figure depicts the roof top tent 15 in an open and expanded state. As aforementioned described, the configuration of the roof top tent 15 as shown is for illustrative purposes. The openings, zippers, windows, rain covers, and the like may be in different locations without impacting the overall teachings of the present invention. A tent attached collapsible ladder 75 is used to access the roof top tent 15 from grade 80. The folding shelves/table 60 (total of three (3) shown are depicted in the lowered or utilization position. They are attached by a continuous hinge 85 at the rearward edge and supported by a retractable cable 90 at the outward edge. The folding shelves/table 60 may be provided with a retaining means 95, such as a low net, folding lip, or other method to prevent items stored on the folding shelves/table 60 from rolling off. The continuous hinge 85 and the retractable cable 90 allow for "fold flat" capability to not interfere with transportation while the camper 10 is in motion, as well as to allow personnel access to stand next to the enclosure 20 to reach the roof top tent 15. A total of two (2) AC receptacles 100 are located at the rear outer portion of the lowermost folding shelves/table 60 for purposes of operating appliances, lights, entertaining, or communication means. A dish shelf 102 is provided on the lowermost folding shelves/table 60 for purposes of hold dirty or just washed dishes. It is envisioned that the dish shelf 102 may be removable or foldable. A swing arm light 105 is mounted to the top platform 70 for purposes of providing general illumination around the campsite during nighttime hours. The dishwashing station 61 remains visible in this view.

Figure 3:
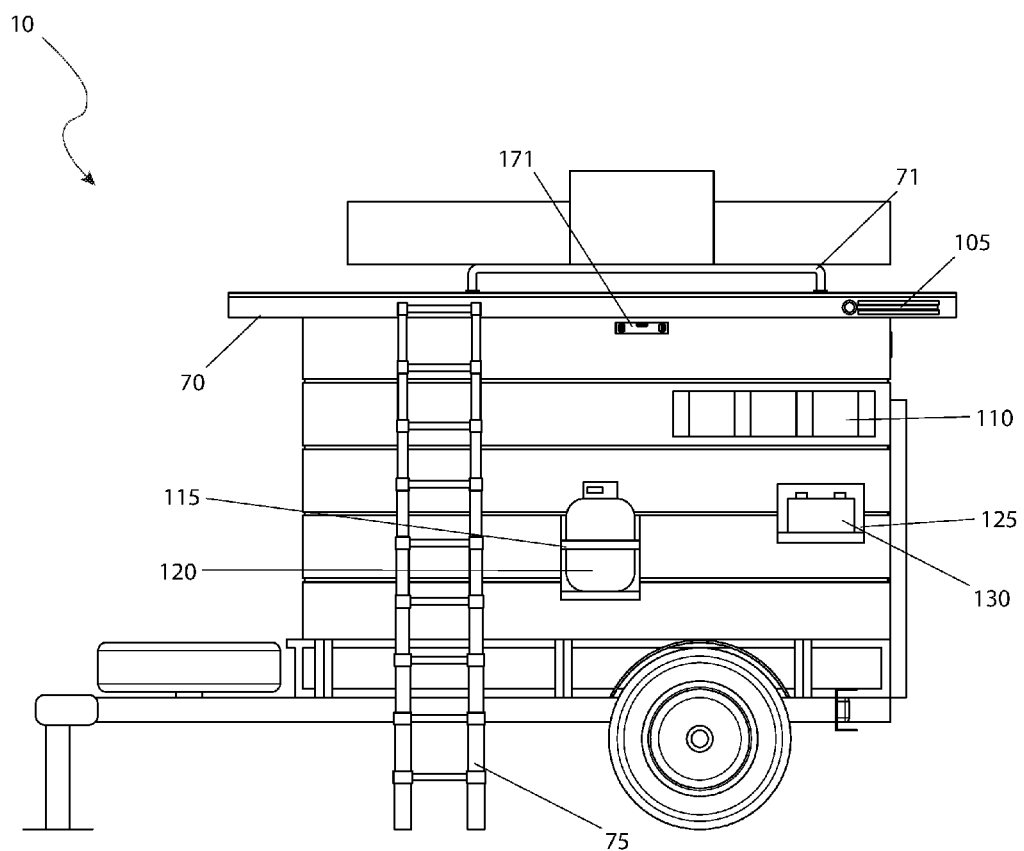
FIG. 3 is a left-side view of the roof top tent camper, according to the preferred embodiment of the present invention.

Referring now to FIG. 3, a left-side view of the camper 10, according to the preferred embodiment of the present invention is shown. The roof top tent 15 is shown in a collapsed configuration. The left-side of the camper 10 is also provided with a swing arm light 105 mounted to the top platform 70. A folding tool rack 110 for holding axes, hatchets, shovels, brooms, and the like. A fuel tank holder 115 (foldable, with a continuous hinge and support cables capable of folding up and securing flat while driving) is configured to hold a fuel tank 120, such as a propane tank used for cooking, and heating. A battery rack 125 (foldable, with a continuous hinge and support cables capable of folding up and securing flat while driving) holds a battery 130 which is used as part of the electrical system for the camper 10. The battery is envisioned as a rechargeable deep cycle battery, Tesla battery, lithium-ion battery, or the like. The exact style of battery 130 is not intended to be a limiting factor of the present invention. Further detail on the battery 130 will be provided herein below. An additional separate detachable collapsible ladder 75 may be provided. A level 171 is provided to ensure that the camper 10 is level.

Figure 4:
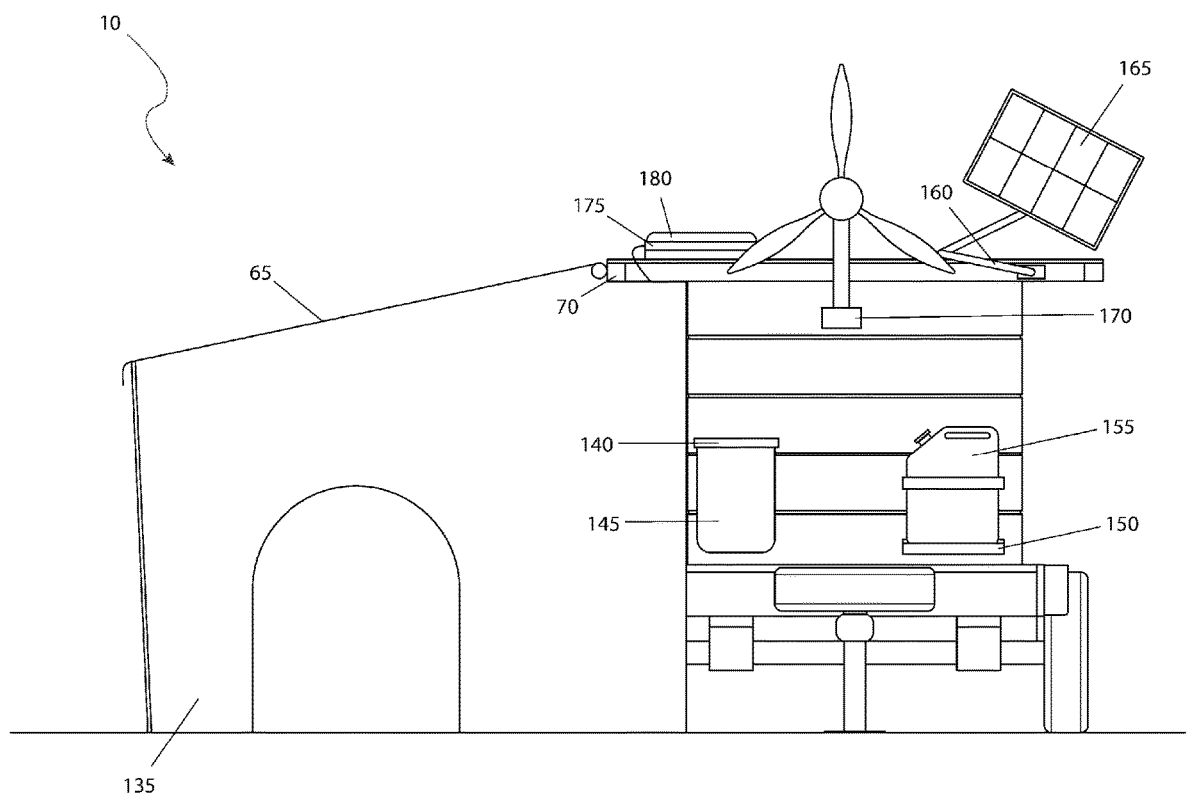
FIG. 4 is a front side view of the roof top tent camper, according to the preferred embodiment of the present invention.

Referring next to FIG. 4, a front side view of the camper 10, according to the preferred embodiment of the present invention is disclosed. Again, the roof top tent 15 is shown in a collapsed configuration. The retractable awning 65 is shown in a deployed position along with optional side covers 135. The use of the side covers 135 generates an additional storage/living area while camping. A trash bag holder 140 (foldable, with a continuous hinge and support cables capable of folding up and securing flat while driving) holds a trash bag 145 on the front face of the enclosure 20. Additionally, a water container holder 150 (foldable, with a continuous hinge and support cables capable of folding up and securing flat while driving) holds a water container 155. The front face of the top platform 70 holds an adjustable arm 160 with a solar panel 165 on its distal end. The adjustable arm 160 provides the ability to rotate and turn the solar panel 165 three-hundred-sixty degrees (360°) to optimize the ability of the solar panel 165 to capture the rays of the sun. A wind turbine 170 is also located on the top platform 70 which is deployed while camping or while in motion. The electrical connections from the solar panel 165 and the wind turbine 170 will be described in greater detail herein below. A wire basket 175 is fastened atop the top platform 70. The wire basket 175 is used to hold a solar water heater 180 which, after heating by solar energy, can be used for showering, cleaning, washing dishes, washing cookware, and the like.

Figure 5:
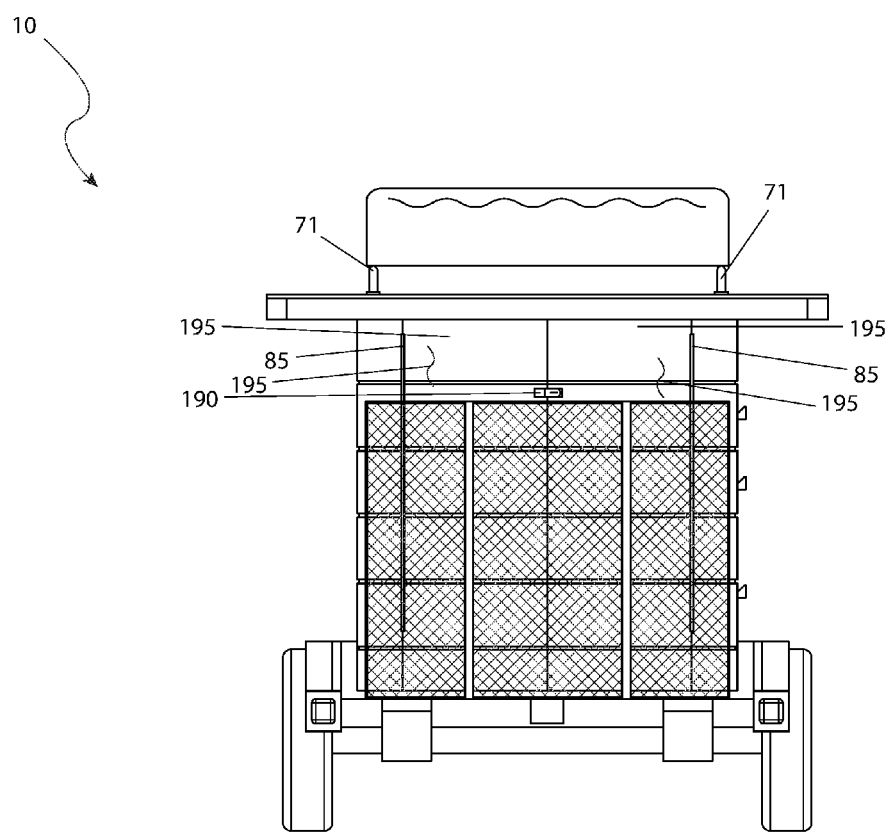
FIG. 5 is a rear side view of the roof top tent camper, with the rear doors in a closed state, according to the preferred embodiment of the present invention.

Referring now to FIG. 5, a rear side view of the camper 10 with the rear doors 185 in a closed state, according to the preferred embodiment of the present invention is depicted. The interior of the enclosure 20 is accessed via two (2) rear doors 185 that are mounted via a continuous hinge 85 along their outer edge and retained at the center via a locking latch 190. The outer surface of each rear doors 185 comprises a durable mesh material 195 such as a metal screen. Further description of the rear doors 185 construction will be provided herein below.

Figure 6:
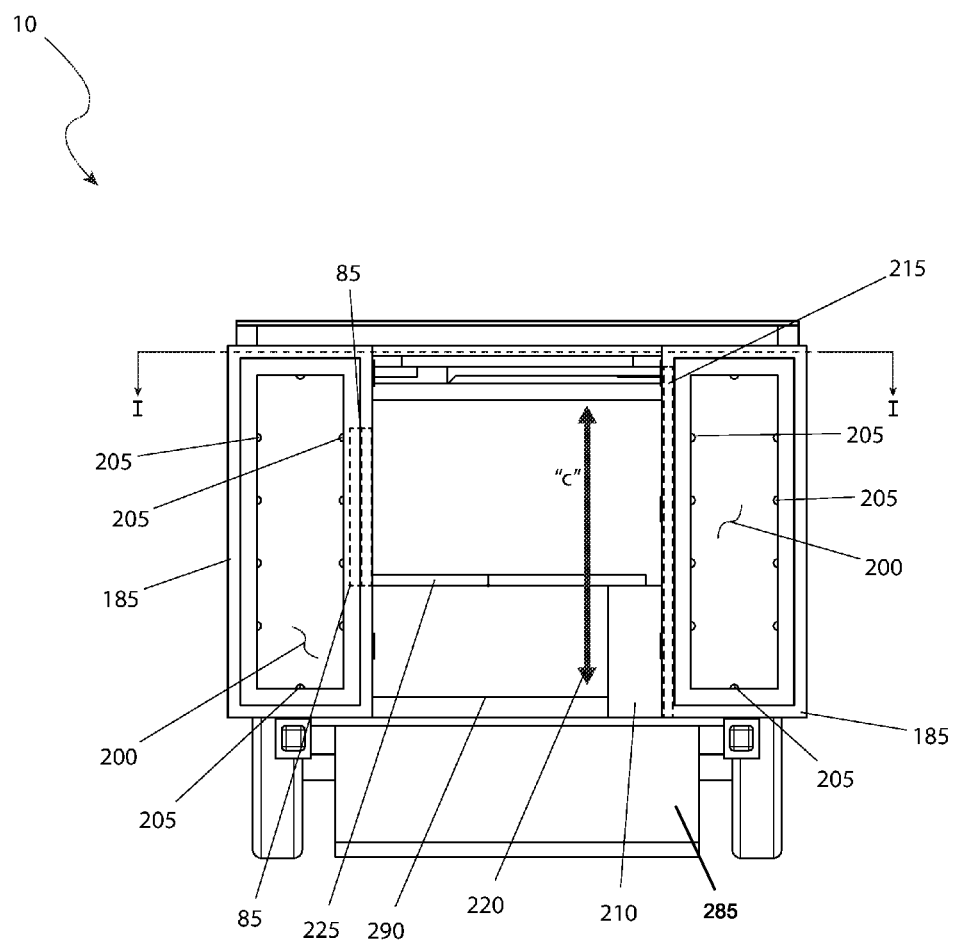
FIG. 6 is a rear side view of the roof top tent camper, with the rear doors in an open state, according to the preferred embodiment of the present invention.

Referring next to FIG. 6, a rear side view of the camper 10, with the rear doors 185 in an open state, according to the preferred embodiment of the present invention is shown. The interior portion of each rear door 185 is provided with a solid panel 200 made of wood, aluminum or the like. It is held in place via a plurality of retaining clips 205. Under normal usage and transport, the solid panels 200 are in place as shown. The solid panels 200 prevent dust, dirt and small items from entering or exiting the interior of the enclosure 20. However, during camping utilization with someone sleeping inside the enclosure 20, the solid panels 200 may be removed. This will allow access to fresh air through the mesh material 195 (as shown in FIG. 5), but still provide protection against wild animals which are unable to claw or chew through the mesh material 195. Alternately, the ramp 285 can be rotated upward and secured in order to provide a protective feature. This provides an enhanced level of protection against fabric-based tents which are often not allowed in areas where large animals are present. The interior of the enclosure 20 is provided with a floor 290, and a storage cabinet 210 that is attached to the enclosure 20 via use of adjustable height rails 215. The adjustable height rails 215 allow the storage cabinets 210 to be positioned anywhere along the cabinet travel path "c" 220. It is envisioned that during transport, the storage cabinets 210 may be positioned at the upper portion of the enclosure 20 (where additional support brackets are used such as retractable steel cables) to allow the storage of camping material at the bottom of the enclosure 20. When positioned at the bottom of the enclosure 20 (as shown), the storage cabinets 210 serves as a base for a folding bed shelf 225. The folding bed shelf 225 folds down via use of two (2) continuous hinges 85 using additional support brackets are used such as retractable cable 90 (not shown in this FIGURE). The deployed position of the folding bed shelf 225 is shown via a dashed line.

Figure 7:
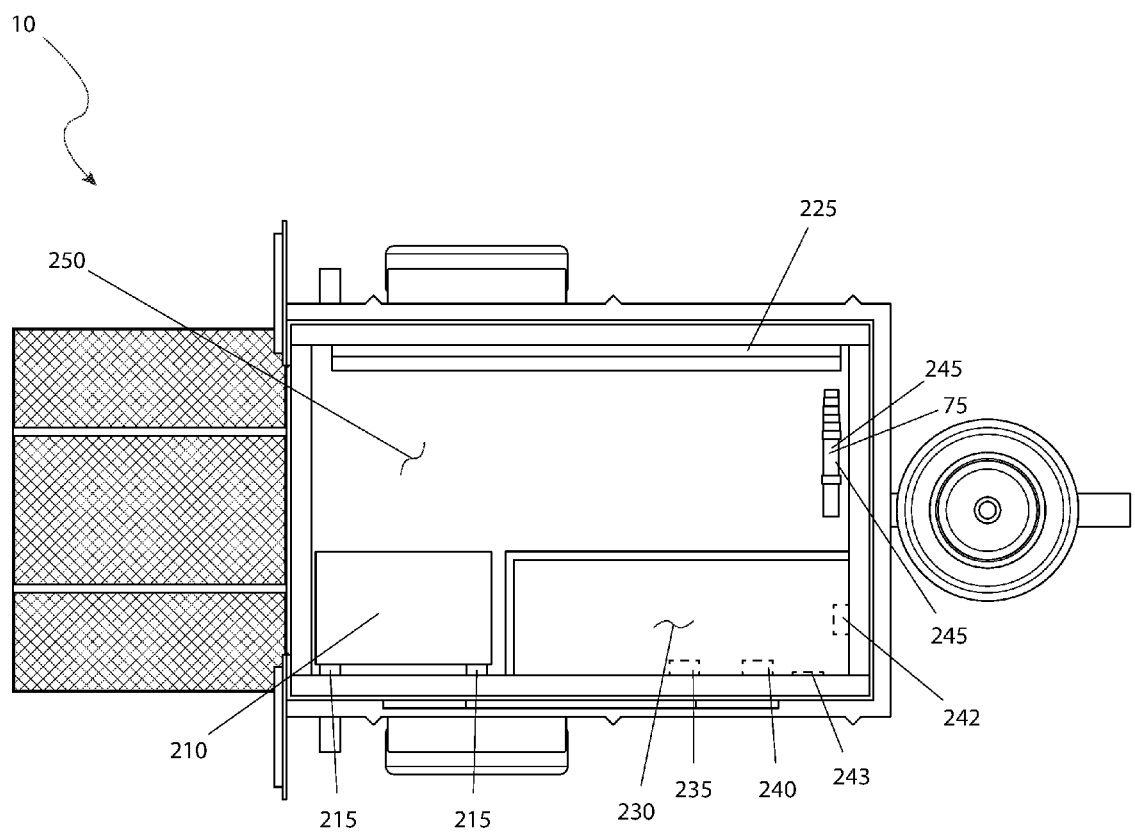
FIG. 7 is a sectional view of the roof top tent camper, as seen along a Line I-I, as shown in FIG. 6, according to the preferred embodiment of the present invention.

Referring now to FIG. 7, a sectional view of the camper 10, as seen along a Line I-I, as shown in FIG. 6, according to the preferred embodiment of the present invention is disclosed. The top plate 255 is shown in retracted and in a stowed state. The storage cabinets 210 are mounted to the adjustable height rails 215. At least one (1) storage shelf 230 is located next to the storage cabinets 210 for storage of camping supplies. A charge controller 235, an inverter 240 and a Wi-Fi hotspot 242, are located under the storage shelf 230, all of which are Wi-Fi shown by a dashed line due to their hidden state. Two (2) "J"-shaped hooks 245 hold the separate detachable collapsible ladder 76. An open storage area 250 is provided in the middle of the enclosure 20 which can be used to hold camping supplies while the camper 10 is being transported such as tables, bicycles, and the like.

Figure 8:
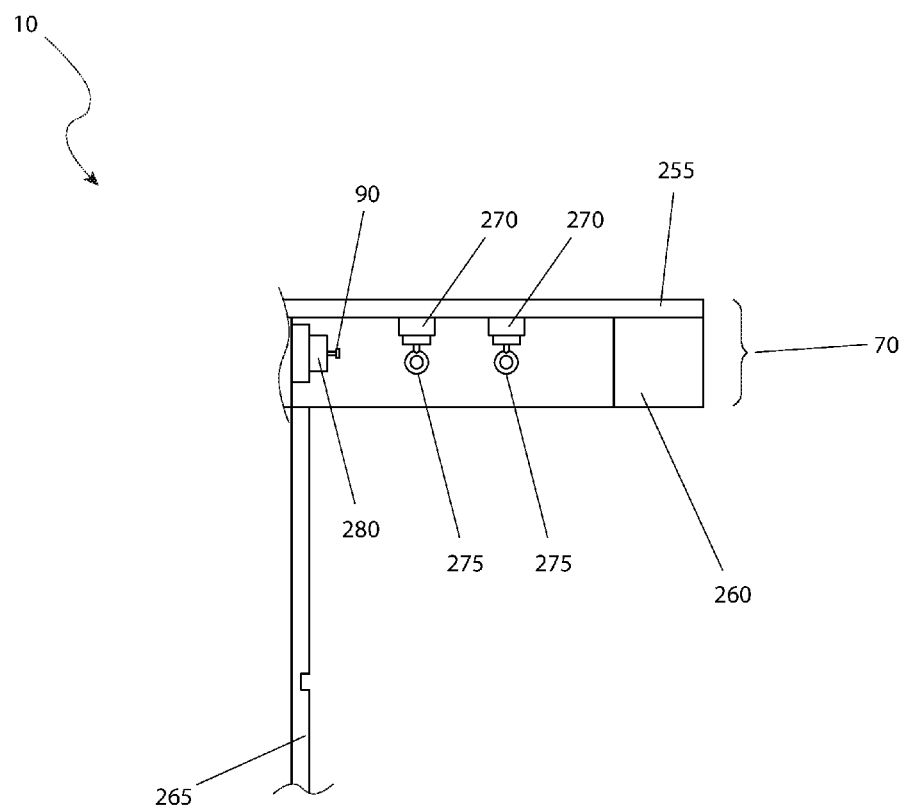
FIG. 8 is a sectional view of the roof top tent camper, as seen along a Line II-II, as shown in FIG. 2, according to the preferred embodiment of the present invention.

Referring next to FIG. 8, a sectional view of the camper 10, as seen along a Line II-II, as shown in FIG. 2, according to the preferred embodiment of the present invention is depicted. The top platform 70 includes a top plate 255 and a side stiffener 260 which are supported by a sidewall 265 of the enclosure 20 (as shown in FIG. 1). At least two (2) sliding support tracks 270 are provided on the underside of the top plate 255 and hold a plurality of tie-down rings 275. The tie-down rings 275 are movable and can slide and secure in any area desired on the sliding support tracks 270, and can be used along with rope, bungee cords, and similar devices to hold down the rear doors 185 (as shown in FIG. 5, tarps, chairs, and other typical campsite items. Multiple retraction reel housings 280 are provided on the sidewall 265 near the sliding support tracks 270. The retraction reel housings 280 holds the retractable cable 90 (as shown in FIG. 2) which hold the folding shelves/table 60, and other foldable items including but not limited to the tool rack 110, the trash bag holder 140, the water container 150, and the like, while they are in a deployed position. When no longer needed, the retractable cable 90 automatically retracts into the retraction reel housings 280 for stowage.

Figure 9:
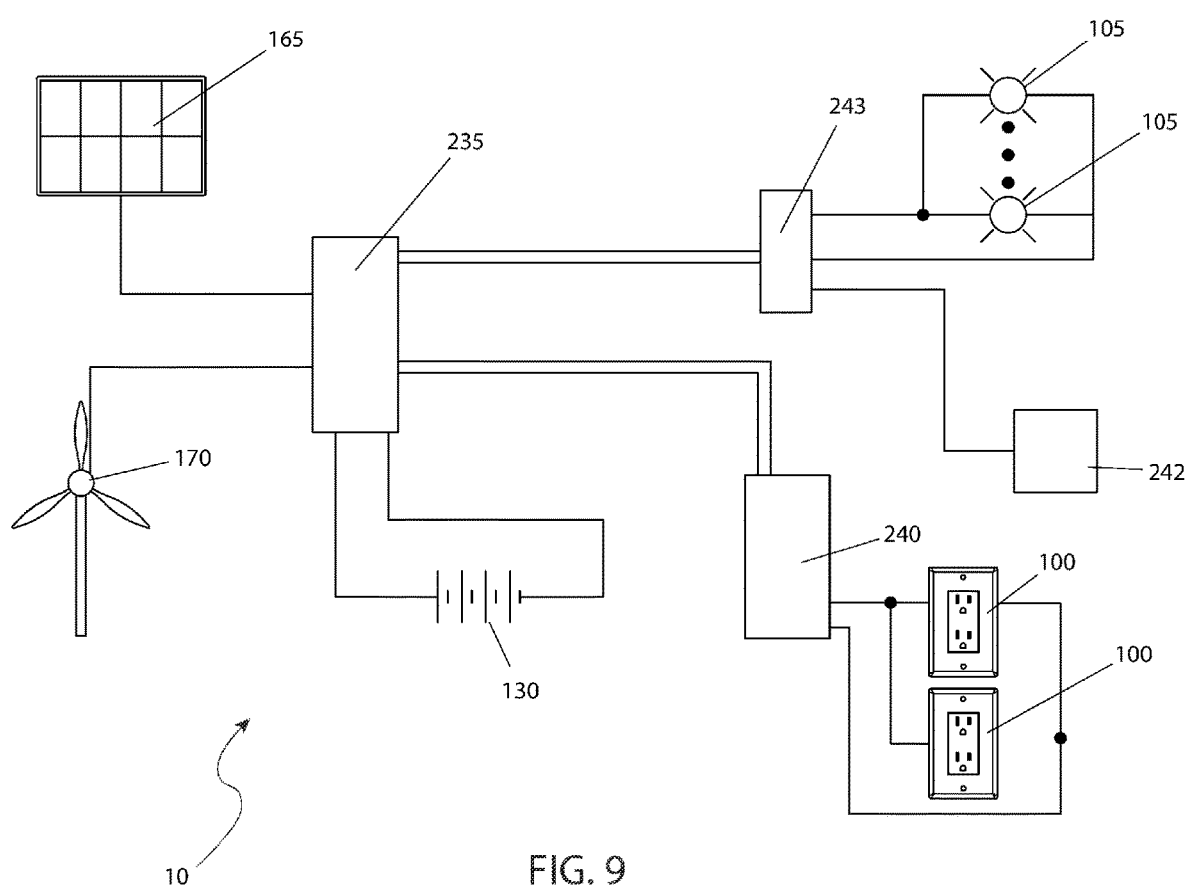
FIG. 9 is an electrical block diagram of the roof top tent camper, according to the preferred embodiment of the present invention.

Referring to FIG. 9, an electrical block diagram of the camper 10, according to the preferred embodiment of the present invention is shown. Incoming power for the camper 10 is provided by either the solar panel 165 or the wind turbine 170, both of which are routed into the charge controller 235. The charge controller 235 is used to charge the battery 130 and can input or output power from the battery 130 as needed for electrical loads on the camper 10. Resultant power from the charge controller 235 is first routed to an inverter 240 which produces 120 volts alternating current (VAC) which is routed to the two (2) AC receptacles 100. Resultant power from the charge controller 235 is also routed to the DC distribution panel 243. The DC distribution panel 243 supplies power to the multiple swing arm lights 105 as well as the Wi-Fi hotspot 242. The Wi-Fi hotspot 242 produces a local Wi-Fi network via a cellular connection, satellite connection, connection to a wide area network (WAN) or a wireless wide area network (WWAN) for use by campsite occupants for internet communication purposes via notebook computers, Wi-Fi phones, tablet computers, and the like.

2. Operation of the Preferred Embodiment

The preferred embodiment of the present invention can be utilized by the common user in a simple and effortless manner with little or no training. It is envisioned that the camper 10 would be constructed in general accordance with FIG. 1 through FIG. 9. The user would procure the camper 10 from conventional procurement channels such as sporting goods stores, home improvement stores, outdoor camping suppliers, discount stores, mail order and internet supply houses and the like. Special attention would be paid to the overall size of the enclosure 20 such that it will fit the desired utility trailer 25.

After procurement and prior to utilization, the camper 10 would be prepared in the following manner: the utility trailer 25 would be procured either preassembled or assembled; the user would position the enclosure 20 upon the utility trailer 25 and fasten it into place; the roof top tent 15 would be fastened to racks 71 atop the top platform 70; any off-road tires 30 would be applied to the utility trailer 25 should they be purchased, and any desired camping supplies would be placed into the enclosure 20.

During utilization of the camper 10, the following procedure would be initiated: the camper 10 would be hitched to a tow vehicle by the hitch 50; driven to a campsite, the separate detachable collapsible ladder 76 would be removed from the hooks 245 and used to deploy and setup the roof top tent 15; the folding shelves/table 60 would be folded down and supported by the retractable cable 90 from the retraction reel housings 280; the solar panel 165 would be rotated on the adjustable arm 160 to face the sun; and the wind turbine 170 would be deployed. At this point in time, the camper 10 is ready for utilization.

After use of the tent camper 10, the roof top tent 15 is collapsed and stored, the solar panel 165 and the wind turbine 170 is stowed, all foldable components such as the folding shelves/table 60, and other foldable items including, but not limited to: the tool rack 110, the trash bag holder 140, the water container 150, and the like, would be retracted and stowed; and all miscellaneous camping supplies are housed in the interior of the enclosure 20. The camper 10 can then be reused at a future date in a repeating cyclical process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A rooftop tent camper, comprising:
a vehicle roof top tent adapted to be disposed on a utility trailer;
an enclosure adapted to be disposed on top of the utility trailer, the enclosure having an interior;
a protective cover placed over the vehicle roof top tent;
a rack receiving the vehicle roof top tent mounted on the rack;
a storage shelf having a charge controller, an inverter, and a Wi-Fi hotspot located under the storage shelf;
a ramp adapted to be mounted on a rear of a frame of the utility trailer, the ramp is disposed opposite a trailer tongue and a hitch;
a plurality of two folding shelves/table disposed on a first side face of the enclosure, the two folding shelves/table are attached by a continuous hinge and a retractable cable;
a retractable awning mounted to a top platform which is unrolled when at a campsite;
a plurality of sliding support tracks disposed on a top plate and hold a plurality of tiedown rings, the top platform includes the top plate and a side stiffener which are supported by a sidewall of the enclosure;
a plurality of retraction reel housings disposed on the sidewall near the sliding support tracks, the retraction reel housings hold the retractable cable which hold the folding shelves/table;
a plurality of incoming power provided by either a solar panel or a wind turbine, both of which are electrically routed into the charge controller, the charge controller also charges a battery and input or output power from the battery as needed for a plurality of electrical loads;
a plurality of resultant power from the charge controller routed to an inverter which produces 120 volts alternating current which is routed to a pair of AC receptacles, the resultant power from the charge controller is also routed to a DC distribution panel;
wherein the interior of the enclosure is accessed via a pair of rear doors that are mounted via a continuous hinge and retained via a locking latch; and
an adjustable swing arm light having mounted to the top platform for providing general illumination around the campsite during nighttime hours and a pair of AC receptacles disposed on the folding shelves/table for operating one or more appliances, one or more lights, one or more entertaining devices, or one or more means for communicating.

2. The roof top tent camper, according to claim 1, wherein the pair of rear doors include a durable mesh material for ventilation and a plurality of solid panels to prevent dust, dirt and one or more small items from entering or exiting the interior of the enclosure.

3. The roof top tent camper, according to claim 1, wherein the interior of the enclosure includes a floor and a storage cabinet that is attached to the enclosure via use of one or more adjustable height rails to allow the storage cabinets to be positioned anywhere along a cabinet travel path.

4. The roof top tent camper, according to claim 1, wherein the rack allows for the vehicle rooftop tent to be utilized with the roof top tent camper and allows for easy removal for long term storage, off-season storage, and clearance.

5. The roof top tent camper, according to claim 1, wherein the ramp is rotated upward and secured to protect the enclosure.

6. The roof top tent camper, according to claim 1, wherein the continuous hinge and the retractable cable fold flat to not interfere with transportation while the roof top tent camper is in motion and to allow personnel access to stand next to the enclosure to reach the roof top tent.

7. The roof top tent camper, according to claim 1, wherein the two folding shelves/table include a means for retaining to prevent one or more items stored on the folding shelves/table from rolling off.

8. The roof top tent camper, according to claim 1, wherein the tie-down rings are movable and slide and secure in any area desired on the sliding support tracks and is used along with a rope or one or more bungee cords to hold down the rear doors.

9. The roof top tent camper, according to claim 1, further comprising a folding tool rack for holding one or more axes, one or more hatchets, one or more shovels, or one or more brooms and a foldable fuel tank holder with a continuous hinge and one or more support cables to hold a fuel tank.

10. The roof top tent camper, according to claim 1, further comprising a foldable battery rack with a continuous hinge and support cables holding a battery selected from the group consisting of a rechargeable deep cycle battery, or a lithium-ion battery.

11. The roof top tent camper, according to claim 1, further comprising a foldable trash bag holder with a continuous hinge and support cables that holds a trash bag on the enclosure and an open storage area provided in the enclosure which holds one or more camping supplies while the roof top tent camper is transported.

12. The roof top tent camper, according to claim 1, further comprising a pair of off-road tires adapted to be utilized on the utility trailer to increase its off-road capabilities and a dishwashing station disposed on a side of the folding shelves/table.

13. The roof top tent camper, according to claim 1, wherein the retractable cable automatically retracts into the retraction reel housings for stowage.

14. The roof top tent camper, according to claim 1, wherein the wind turbine is disposed on the top platform which is deployed while camping or while in motion.

15. The roof top tent camper, according to claim 1, wherein the adjustable arm includes the solar panel disposed on a distal end and is rotated 360 degrees.

16. The roof top tent camper, according to claim 1, wherein the DC distribution panel supplies power to a plurality of swing arm lights as well as the Wi-Fi hotspot.

* * * * *